(12) United States Patent
Angelo et al.

(10) Patent No.: US 7,003,672 B2
(45) Date of Patent: Feb. 21, 2006

(54) AUTHENTICATION AND VERIFICATION FOR USE OF SOFTWARE

(75) Inventors: Michael F. Angelo, Houston, TX (US); Manuel Novoa, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 813 days.

(21) Appl. No.: 09/962,631

(22) Filed: Sep. 25, 2001

(65) Prior Publication Data

US 2003/0061487 A1    Mar. 27, 2003

(51) Int. Cl.
    *G06F 12/00* (2006.01)
(52) U.S. Cl. ...................... 713/189; 713/176; 713/193; 723/22
(58) Field of Classification Search ................ 713/153, 713/164–167, 176, 189, 193, 201; 709/223
    See application file for complete search history.

(56) References Cited

U.S. PATENT DOCUMENTS

| 5,421,006 | A | 5/1995 | Jablon et al. ................ 395/575 |
|---|---|---|---|
| 5,537,540 | A | 7/1996 | Miller et al. |
| 5,657,445 | A | 8/1997 | Pearce |
| 5,694,569 | A | 12/1997 | Fischer |
| 5,694,582 | A | 12/1997 | Pearce |
| 5,859,911 | A | 1/1999 | Angelo et al. ................ 380/25 |
| 5,944,821 | A | 8/1999 | Angelo |
| 6,173,446 | B1 * | 1/2001 | Khan et al. ................. 717/127 |
| 6,553,494 | B1 * | 4/2003 | Glass .......................... 713/186 |
| 6,683,954 | B1 * | 1/2004 | Searle .......................... 380/30 |
| 6,694,434 | B1 * | 2/2004 | McGee et al. .............. 713/189 |
| 6,728,964 | B1 * | 4/2004 | Butt ............................. 719/313 |

* cited by examiner

*Primary Examiner*—Gilberto Barrón, Jr.
*Assistant Examiner*—Minh Dinh

(57) ABSTRACT

A computer system comprises a security computer having a security database and at least one workstation computer on which software is accessible for execution. The database includes security values that the workstation computers use to verify whether their copy of software is authentic (i.e., unmodified such as might occur from action of a virus). The database can also be used verify whether the software can be run on a particular workstation computer.

31 Claims, 2 Drawing Sheets

AUTHENTICATION AND VERIFICATION FOR USE OF SOFTWARE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to authentication and verification for use of software. More particularly, the invention relates to verifying the authenticity of software that is selected for execution. Also more particularly, the invention relates to verifying whether a particular software application is authorized to run on a particular computer.

2. Background of the Invention

As computers have proliferated at residences and businesses, and as networks, such as the Internet, have made the nation-wide and world-wide dissemination of information readily available, security of such information has become a significant problem. For instance, computer "viruses," unfortunately have become a part of every day life. A virus generally is an executable code that can be spread via email messages (and typically as attachments to emails). Once released into a computer, the virus performs whatever task it has been programmed to do. Typically, that task is to maliciously impair the performance of the infected computer. One way a virus infects a computer is by attaching itself to existing software stored on the computer's storage device. Once modified by a virus, the infected software may execute improperly or cause serious damage to the information contained in the computer and even wipe out much or all of the data contained therein. A virus may also locate the email addresses of other persons stored in the infected computer, replicate itself, and automatically transmit virus infected email messages to other people.

Various ways have been proposed to address this type of security problem. Many types of anti-virus software are available. Such software generally attempts to detect the presence of viruses in incoming email messages or on removable storage media, such as floppy disks. If successful in detecting the presence of a virus, the anti-virus software will alert the user of the problem and attack the virus so as to render it harmless. Unfortunately, however, anti-virus software is not foolproof. If a virus creator knows how a particular anti-virus program detects viruses, then that person can devise a new type of virus that can avoid the inoculative reach of the anti-virus software. Accordingly, virus creators constantly attempt to stay one step ahead of current anti-virus software programs, and anti-virus software developers constantly respond to new virus threats by developing better anti-virus software. Thus, although very helpful, anti-virus software is not without its limitations.

U.S. Pat. No. 5,421,006 to Jablon describes a different approach to the problem. As described in the Jablon patent, during the initialization process, the computer examines all of the executable programs contained in a computer. Each program has been stored on the computer along with a confidential code derived from the program itself. These confidential codes are stored in a particular piece of memory that is accessible generally only during initialization. During initialization, the computer computes a confidential code for a program and then compares the newly computed code to the code associated with that program stored in the secure memory. If the codes match, the software is deemed to be acceptable for further use and the initialization process completes. If the codes do not match, the software is deemed to have been previously modified in some way (e.g., by a virus) and is not accessible for further use. Thus, Jablon provides a technique for verifying the authenticity of software during system initialization. Jablon fails to address the issue of a program that, although deemed authentic during initialization, becomes modified during system use such as might occur with a virus infected email message.

Thus, there is still a need to provide a security mechanism in a computer system to protect its software against unauthorized modification.

BRIEF SUMMARY OF THE INVENTION

The problems noted above are solved in large part by a computer system in which software is authenticated when it is selected to be run. The system preferably includes a computer which has a security function, as well as other functions if desired. The system also includes at least one other workstation computer coupled to the security computer via a communication link. A security database is stored on the security computer. The database includes an entry for each software application for which it is desired to provide the security protection described herein. Each entry preferably includes a value that identifies the software (e.g., name) and a security value. The security value preferably comprises a cryptographic checksum or hash of the executable object code or a manufacturer's code associated with the software. The hash may be encrypted using a private key or a secret key When another copy of the object code, accessible to a workstation computer, is selected to be executed, the workstation computer computes its own hash of its copy of the object code. The workstation computer also retrieves the encrypted hash associated with the selected software, decrypts the hash using a public key corresponding to the private key that was used to encrypt the hash, and compares the computed hash to the decrypted hash. If the hashes match, the workstation computer determines its copy of the object code to be authentic (i.e., unmodified such as by a virus). If the hashes do not match, then the workstation computer determines its copy of the object code to be unauthentic and takes an appropriate security action, such as precluding execution of the software, alerting a network administrator, and/or alerting the operator of the workstation computer. Also, the loader (commonly included in every PC to load applications into memory) can be readily modified to check software determined to be unauthentic to scan the software for viruses or other types of unauthentic code that may have been embedded in the software. Such virus scanning algorithms are well known in the art. Further, once the virus is detected, it can be corrected (i.e., removed or otherwise inoculated) by the loader. In general, the loader could call a registered application (i.e., an application validated as explained herein) to scan the software for unauthorized code or include a virus scanner in the loader itself. Further, the loader could look for, or cause to be looked for, malicious activity in the software (i.e., calls to format or overwrite files).

In another embodiment of the invention, the security database can be incorporated with additional fields of information that permits a network administrator to specify on which computers a particular software application is authorized to be executed. To this end, a hash of the first hash of the object code is computed and encrypted using a value unique to the computer on which the software is authorized to execute. Further, multiple second hashes can be encrypted, each such encrypted second hash using, as an encryption key, a unique value associated with each computer on which the software is authorized to execute. The unique value may include the workstation computer's serial number, IP address, or other unique value. After the workstation computer computes the first hash and verifies that the software is authentic (as explained above), the workstation computer computes a second hash of the first hash, retrieves the encrypted second hash fields from the security database, and decrypts each one using that computer's unique value. If any of the decrypted second hashes from the security database match the second hash computed by the workstation computer, the computer determines that the software is authorized to run on that computer. If none of the second hashes match, the computer determines that the software is not authorized to run on that computer and takes appropriate action, such as refusing to execute the software, alerting a network administrator, and the like.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

Figures 1, 2:
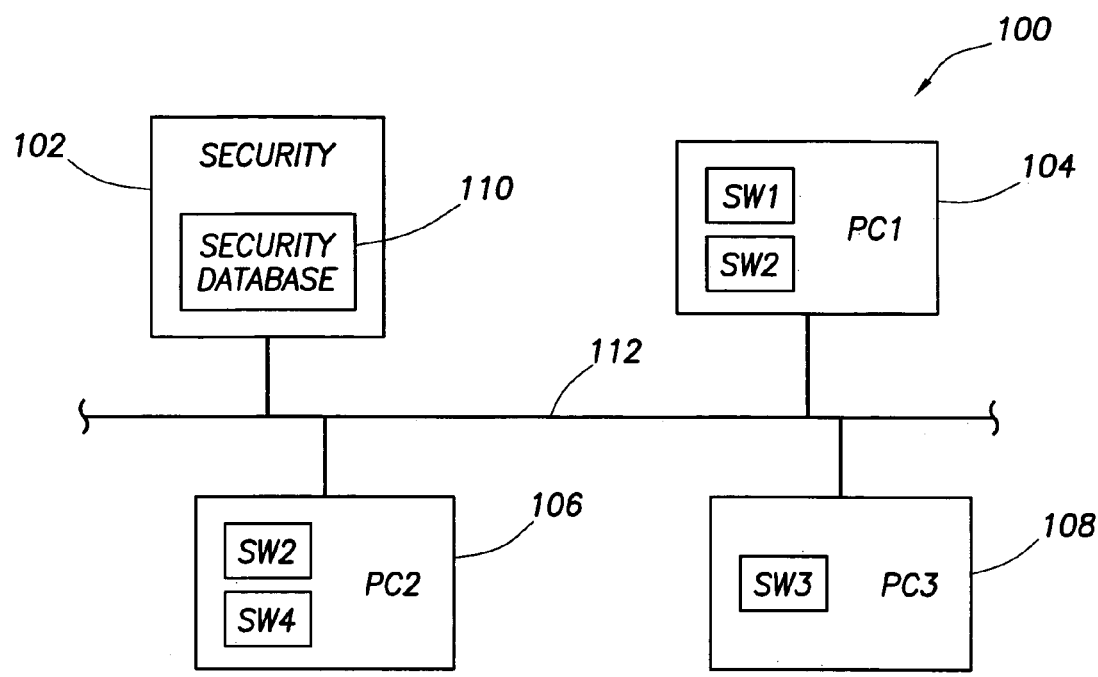
FIG. 1 shows a computer system implementing a security feature constructed in accordance with the preferred embodiment of the invention.
FIG. 2 shows a security database used in the security feature to permit software object code to be authenticated.

Referring now to FIG. 1, a computer system 100 is shown in accordance with the preferred embodiment of the invention. As shown, system 100 includes a security computer 102, and three workstation computers PC1–PC3 designated as computers 104, 106 and 108. All four computers are networked together via a communication link 112. Fewer or more than three computers 104–108 can be included in system 100 as desired. Computer 102 preferably is the computer console used by a network administrator. This disclosure, however, and the claims which follow should not be construed as being so limited. In general, computer 102 is any type of computing entity that provides the security functionality described herein. Computers 104–108 generally are any suitable type of computers or computing entities that can execute software stored therein or stored on other computers or network attached storage devices. Examples of executable software are depicted in FIG. 1 as SW1–SW4. SW1–SW4 thus are preferably executable object code. As shown, not all of the computers 104–106 need have the same software load, although they can, if desired.

Security computer 102 preferably includes a security database 110, which is depicted in greater detail in FIG. 2. The security database preferably includes at least one entry, and typically will have the capacity for a plurality of entries. Each entry includes two fields of information 120 and 122, and more if desired. Field 120 contains the name of the computer program (e.g., Word, Excel, etc.). Alternatively, field 120 can contain any value that uniquely identifies a computer program executed by any of computers 104–108. Field 122 contains a security value that is used in accordance with the preferred embodiment of the invention to authenticate the software identified by the value in field 120. One type of value that can be used in field 122 is a signed (i.e., encrypted) "hash" of the executable object code of the software identified in field 120. Alternatively, field 122 may contain a signed hash of a manufacturer's code which may accompany the software from the software manufacturer. The manufacturer's code typically is used in conventional systems to provide a mechanism for a purchaser to verify that the software has not been modified from the factory and is legitimate. In general, field 122 may contain an encryption of any value that is unique to the software and that is present in or with all executable copies of the software.

Briefly, a "hash" is a mathematical function that, when applied to a data set, creates a "digest." If the data set is altered, the digest that results from applying the hash will be different. In accordance with the preferred embodiment, a hash function is applied to each of the software SW1–SW4 that may be run on the computers 104–108. Each resulting digest value is then encrypted preferably using a "private" key, which may be the private key of a network administrator. The encrypted digest is shown in FIG. 2 as the "signed hash" value stored in field 122 of the security database 110. The signed hash value is also referred to as H1 for purposes of this disclosure.

When an operator of a computer 104–108 wishes to run a particular program SW1–SW4, the operator "clicks" on the application, or selects the application to run in accordance with any suitable technique. Alternatively, the software may be selected for execution by another application. In conventional computer systems, the operating system loaded on the computer would then perform various well known tasks to cause the selected application to execute. In accordance with the preferred embodiment of the invention, however, the operating system preferably performs the following security feature, or otherwise causes the following security feature to be performed. The workstation computer on which the application is to run preferably computes a hash of the copy of the object code to be executed thereon. The hash function used by the computer preferably is the same hash function that was used to create hash H1 stored in the security database 110. The workstation computer also retrieves the previously computed, signed hash H1 from the security database corresponding to the program to be run. The computer decrypts the signed hash using a public key that corresponds to the private key used to encrypt the hash in the first place.

The computer then compares the two hashes—the newly computed hash of the particular copy of the object code to be executed and the previously computed hash of presumably the same object code. If the object code has been modified in any way, the newly computed hash will differ from the previously computed hash. Accordingly, the computer 104–108 attempts to authenticate its copy of the object code to be executed by comparing the two hashes. If they match, then computer determines that the object code is authentic, and then proceeds with running the software. If, on the other hand, the hashes do not match, such as would be true with a virus infected object code, the computer does not authenticate the object code and performs any suitable type of security action. Such security actions may include simply not running the software, alerting the workstation computer operator to the problem, alerting a network administrator, disconnecting the workstation computer failing to authenticate from the network, etc. Thus, the security feature described above permits a copy of an object code to be authenticated every time it is executed by any computer.

Figure 3:
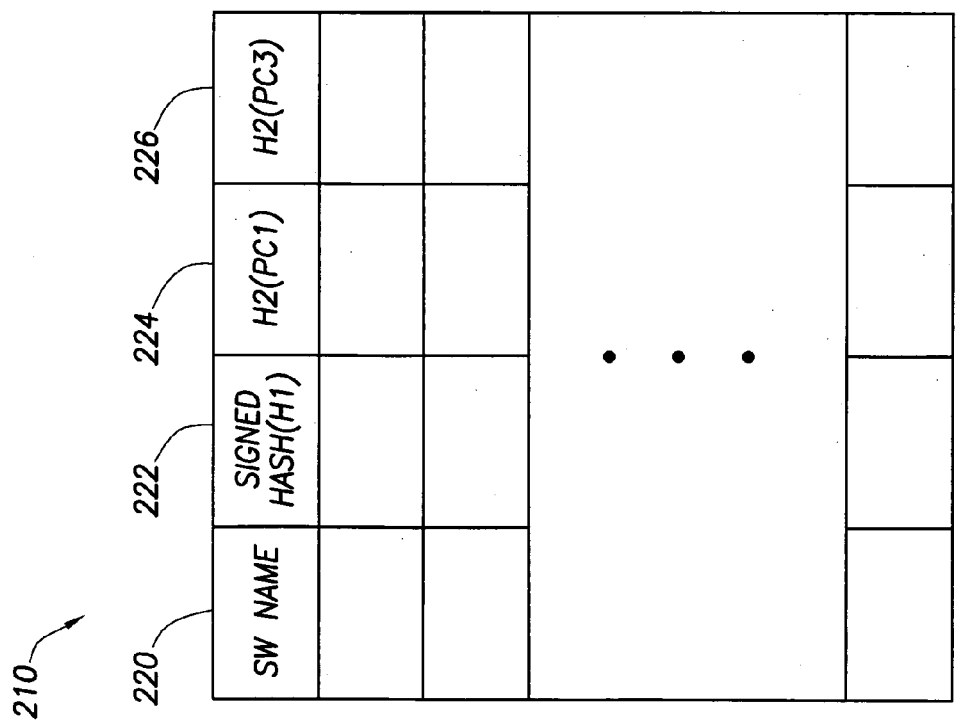
FIG. 3 shows an alternative security database that permits software object code to be authenticated and to be verified for use on a particular computer.

In addition to being able to authenticate a program, the security feature of the present invention also can be used to permit specified software run only on specified computers, and not necessarily all computers that are part of system 100. This functionality can be implemented by using the security database 210 in FIG. 3 in place of database 110 (FIG. 2). As shown in FIG. 3, security database 210 includes two of the same fields from database 110, that is, the software name field 220 and the signed hash (H1) field 222. These fields are used in the same manner that the corresponding fields 120 and 122 were used to authenticate the object code. In addition to authenticating the object code, a network administrator can use fields 224 and 226 to specify on which computers 104–108 each object code is permitted to run. As such, even if a program is authentic (i.e., has not been modified such as by a virus), the program can be limited for security or other reasons to be run only on certain computers.

Each field 224 and 226 preferably contains a signed hash of H1, that is, a hash of a hash. This second hash is encrypted using a value uniquely associated with a computer on which the associated program is permitted to run. For example, in the top row of database 210 in field 224, hash H2 has been computed with a value unique to PC1 (computer 104 in FIG. 1). Hash H2 in field 226 has been computed with a value unique to PC3 (computer 106). Additional fields containing hash H2 values can be added to each entry in the security database 210 to permit the program associated with that entry to be run on whatever computers are desired. The value used to compute the second hash H2 may be any value that is preferably unique to each computer or unique to a group of computers. The value may be, for example, an Internet Protocol ("IP") address, workstation computer serial number, or any unique value assigned to each computer. If desired, as noted above, a group of computers may have the same unique value. In this way, all of the computers comprising a particular department of a company (e.g., accounting) can be assigned the same unique value which is used to compute H2. Thus, H1 is the encrypted hash of the object and the second hashes (H2) are the encrypted hash of the hash of the object code.

Figure 4:
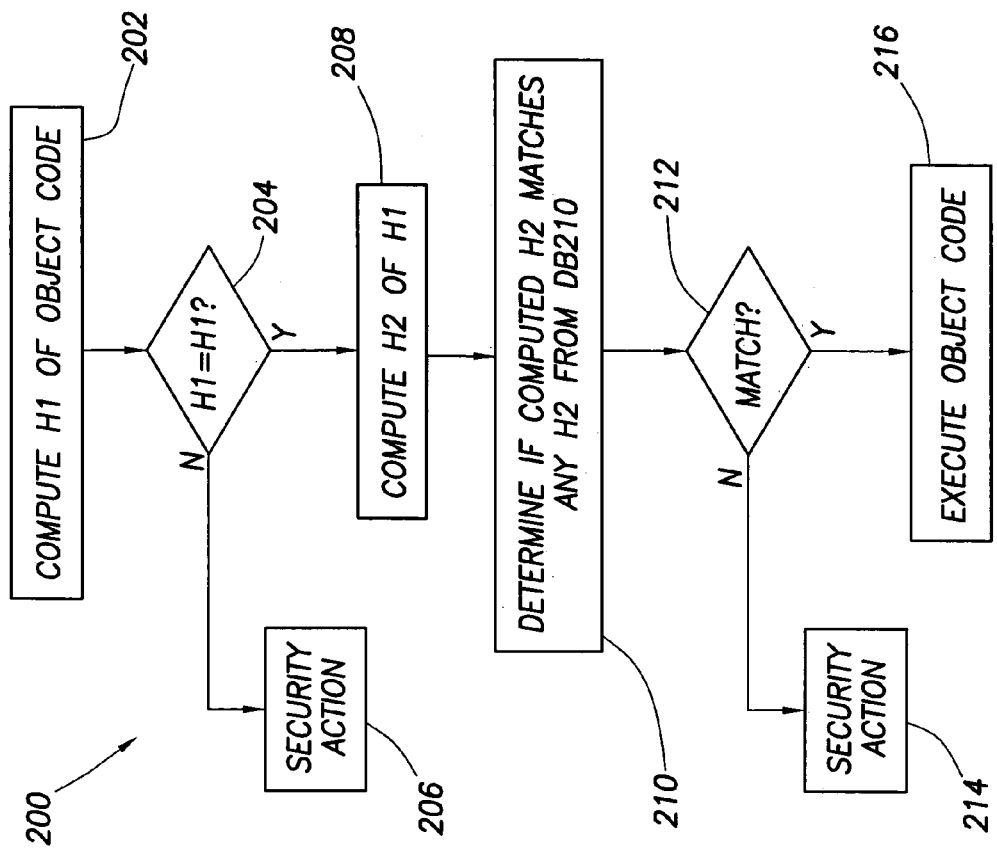
FIG. 4 depicts an exemplary method of using the database of FIG. 3 to authenticate and verify the software for use on a particular computer.

FIG. 4 illustrates the preferred process for how the H1 and H2 values are used. As shown, security process 200 preferably includes processes 202–216. In process 202, the workstation computer on which an operator desires to run a particular program computes a hash H1 of the object code of the program. In 204, the computer compares the newly computed hash H1 with the decrypted hash from the security database 210, as explained previously. If the hashes H1 do not match, then a security action is performed in 206. The security action may include any suitable action, as noted previously, such as simply not running the software, alerting the computer operator to the problem, alerting the network administrator, disconnecting the computer failing to authenticate from the network, etc. If, however, the hash H1 values match in 204, then the computer determines that its copy of the object to be executed is authentic (i.e., unmodified) and next proceeds to verify whether the object code can be run on the particular computer desired by the operator.

In process 208, the workstation computer computes a hash of the hash H1 that it computed in 202. The computer also retrieves each of the encrypted hash H2s from the security database 210 and decrypts them using the computer's unique value that would have been used to create a hash H2 if it was desired to permit the program to be run on that particular computer. If a match is found between the newly created hash H2 (created by process 208) and a decrypted hash H2 from the security database, then the computer determines that the object code is verified to run on that machine and the computer executes the object accordingly (process 216). If the newly computed hash H2 does not match any of the decrypted hash H2's from the security database, then the computer determines that that program is not permitted to run on that computer and security action 214 is performed. Any suitable type of action 214 can be performed such as simply not executing the object code, alerting the computer operator and/or network administrator to the problem, etc. The embodiment depicted in FIGS. 3 and 4 thus permits a network administrator to restrict execution of certain programs to certain computers.

If desired, the first hash can be encrypted with a private key of the manufacturer of the software. Then, the encrypted first can again be hashed and signed with a private key associated with a network administrator. Preferably, the network administrator (or equivalent) only signs those hashes corresponding to licensed software. In this way, software can be verified in two ways. First, the authenticity of software can be verified. Second, only licensed software can be permitted to run. Also, the order in which the two signatures are verified can be changed. That is, the manufacturer's authentication can be verified first to determine if the code is authentic. Then, the administrator's signature can be verified to determine if the code is licensed to run on the given machine. In this way, the time need not be spent verifying whether the code is licensed if it is not authentic. Alternatively, the administrator's signature can be verified first before the first hash is verified. In this latter way, the time need not be spent verifying whether the code is authentic if the code is not even properly licensed. It should be noted that the second hash may be computed based on just the first hash or the combination of the first hash with the object code itself.

The above discussion is meant to be illustrative of the principles and various embodiments of the present invention. Numerous variations and modifications will become apparent to those skilled in the art once the above disclosure is fully appreciated. For example, each entire entry in the security database 110, 210 can be signed by a network administrator to unauthorized access and tampering of the security database. It is intended that the following claims be interpreted to embrace all such variations and modifications.

What is claimed is:

1. A method of authenticating software, comprising:
   (a) selecting software to run on a computer;
   (b) computing a first hash of a copy of object code associated with the software;
   (c) retrieving a first encrypted security value, said first encrypted security value being an encrypted hash of another copy of object code associated with the software;
   (d) decrypting the first encrypted security value to produce a first security value;
   (e) comparing the first hash from (b) to the first security value from (d);
   (f) computing a second hash of a combination of the first hash and the copy of the object code from (b);
   (g) retrieving a second encrypted security value, said second encrypted security value being an encrypted hash of a combination of the first security value and said another copy of the object code;
   (h) decrypting the second encrypted security value to produce a second security value; and
   (i) comparing the second hash to the second security value.

2. The method of claim 1 wherein in (e) if the first hash matches the first security value, determining that the copy of the object code selected to run on the computer is authentic.

3. The method of claim 1 wherein in (e) if the first hash does not match the first security value, determining that the copy of the object code selected to run on the computer is not authentic.

4. The method of claim 3 wherein, if the object code is not authentic, not executing the object code.

5. The method of claim 3 wherein, if the object code is not authentic, alerting a network administrator that the object code is not authentic.

6. The method of claim 1 wherein (h) includes decrypting the second encrypted security value using a value unique to the computer on which the software is to run.

7. The method of claim 5 wherein said unique value comprises the computer's serial number.

8. The method of claim 5 wherein said unique value comprises the computer's IP address.

9. The method of claim 1 wherein if the second hash and the second security value match, then the computer determines that object code is authorized to run on the computer.

10. The method of claim 1 wherein if the second hash and the second security value do not match, then the computer determines that object code is not authorized to run on the computer.

11. The method of claim 10 wherein if the object code is determined not to be authorized to run on the computer, precluding the software from being run on the computer.

12. The method of claim 10 wherein if the object code is determined not to be authorized to run on the computer, transmitting a message to a network administrator informing the network administrator that the object code is not authorized to run on the computer.

13. The method claim 1 wherein if the first hash matches the first security value and the second hash matches the second security value, then the computer determines that the copy of the object code selected to run on the computer is authentic and the copy of the object is authorized to run on the computer.

14. The method of claim 1 wherein if the first hash matches the first security value and the second hash does not match the second security value, then the computer determines that the copy of the object code selected to run on the computer is authentic, but the copy of the object is not authorized to run on the computer.

15. The method of claim 14 further including precluding the software from being run on the computer.

16. A computer system, comprising:
    a security computer on which a security database is stored;
    at least one workstation computer coupled to a network administrator computer via a communication link;
    software accessible to said workstation computer for execution thereon; and
    wherein said security database includes an entry for software that can be executed on the workstation computer, said entry including:
        an encrypted first hash of object code associated with the software that is used by said workstation computer to verify the authenticity of the software when the software is selected to be executed; and
        an encrypted second hash of a combination of the first hash and the object code, the workstation computer uses the encrypted second hash to determine whether the software is authorized to run on the workstation computer.

17. The computer system of claim 16 wherein said encrypted first hash was encrypted using a private key associated with the security computer.

18. The computer system of claim 16 wherein said workstation computer computes a hash of object associated with the software accessible to said workstation computer and compares the computed hash to the encrypted first hash from the security database.

19. The computer system of claim 18 wherein said workstation computer retrieves the encrypted first hash of the object code from the security database and decrypts the encrypted first hash before comparing it to the hash computed by the workstation computer.

20. The computer system of claim 19 wherein the workstation computer determines the software to be authentic if the computed hash matches the hash decrypted from the encrypted first hash.

21. The computer system of claim 19 wherein the workstation computer determines the software to be unauthentic if the computed hash does not match the hash decrypted from the encrypted first hash.

22. The computer system of claim 21, wherein, for unauthentic software, the workstation computer precludes execution of the software.

23. The computer system of claim 21, wherein, for unauthentic software, the workstation computer sends an alert message to the security computer indicating that software has been determined to be unauthentic.

24. The computer system of claim 21, wherein, for unauthentic software, the workstation computer alerts the operator of the workstation computer that the software is not authentic.

25. The computer system of claim 16 wherein the second hash is encrypted using a value unique to a computer on which the associated software is authorized to run.

26. The computer system of claim 16 wherein the second hash is encrypted multiple times, each time using a value unique to a computer on which the associated software is authorized to run.

27. A method of authenticating software, comprising:
  (a) selecting software to run on a computer;
  (b) computing a first hash of a value uniquely associated with the software;
  (c) retrieving a first encrypted security value, said first encrypted security value being an encrypted hash of a value uniquely associated with another copy of the software;
  (d) decrypting the first encrypted security value to produce a first security value;
  (e) comparing the first hash from (b) to the first security value from (d);
  (f) computing a second hash of a combination of the first hash and the value uniquely associated with the software from (b);
  (g) retrieving a second encrypted security value, said second encrypted security value being an encrypted hash of a combination of the first security value and the value uniquely associated with said another copy of the software;
  (h) decrypting the second encrypted security value to produce a second security value; and
  (i) comparing the second hash to the second security value.

28. The method of claim 27 wherein said value unique to the software includes a manufacturer's code.

29. A computer system, comprising:
  a security computer on which a security database is stored;
  at least one workstation computer coupled to a network administrator computer via a communication link;
  software accessible to said workstation computer for execution thereon; and
  wherein said security database includes an entry for software that can be executed on the workstation computer, said entry including:
    an encrypted first hash of a value uniquely associated with the software that is used by said workstation computer to verify the authenticity of the software when the software is selected to be executed; and
    an encrypted second hash of a combination of the first hash and the value uniquely associated with the software, the workstation computer uses the encrypted second hash to determine whether the software is authorized to run on the workstation computer.

30. The computer system of claim 29 wherein said value unique to the software includes a manufacturer's code.

31. A method of authenticating software, comprising:
  (a) computing a first hash of a copy of object code associated with the software;
  (b) retrieving a first encrypted security value, said first encrypted security value being an encrypted hash using a private key associated with the software manufacturer of another copy of object code associated with the software;
  (c) decrypting the first encrypted security value to produce a first security value, said decrypting including using a public key associated with the manufacturer of the software;
  (d) comparing the first hash from (a) to the first security value from (c);
  (e) computing a second hash of the combination of the first hash from (a) and the object code associated with the software;
  (f) retrieving a second encrypted security value, said second encrypted security value being an encrypted hash of the combination of the first security value and the object code using a private key associated with a network administrator;
  (g) decrypting the second encrypted security value to produce a second security value using a public key associated with the network administrator; and
  (h) comparing the second hash to the second security value.

* * * * *

UNITED STATES PATENT AND TRADEMARK OFFICE
CERTIFICATE OF CORRECTION

| | | |
|---|---|---|
| PATENT NO. | : 7,003,672 B2 | Page 1 of 1 |
| APPLICATION NO. | : 09/962631 | |
| DATED | : February 21, 2006 | |
| INVENTOR(S) | : Michael F. Angelo et al. | |

It is certified that error appears in the above-identified patent and that said Letters Patent is hereby corrected as shown below:

In column 7, line 46, in Claim 7, delete "claim 5" and insert -- claim 6 --, therefor.

In column 7, line 48, in Claim 8, delete "claim 5" and insert -- claim 6 --, therefor.

In column 7, line 65, in Claim 13, after "method" insert -- of --.

Signed and Sealed this

Twenty-sixth Day of May, 2009

JOHN DOLL
*Acting Director of the United States Patent and Trademark Office*